United States Patent
Kosaka

(10) Patent No.: US 6,381,389 B1
(45) Date of Patent: Apr. 30, 2002

(54) OPTICAL COUPLING DEVICE AND OPTICAL COUPLING METHOD USING PHOTONIC CRYSTAL

(75) Inventor: Hideo Kosaka, Tokyo (JP)

(73) Assignee: NEC Corporation, Tokyo (JP)

( * ) Notice: Subject to any disclaimer, the term of this patent is extended or adjusted under 35 U.S.C. 154(b) by 7 days.

(21) Appl. No.: 09/598,316

(22) Filed: Jun. 21, 2000

(30) Foreign Application Priority Data

Jun. 23, 1999 (JP) .......................................... 11-177495

(51) Int. Cl.[7] .................................................. G02B 6/30
(52) U.S. Cl. .............................. 385/39; 385/49; 385/50; 385/36
(58) Field of Search .............................. 385/39, 49, 50, 385/36

(56) References Cited

U.S. PATENT DOCUMENTS 5,526,449 A * 6/1996 Meade et al. ................. 385/14
6,317,554 B1 * 11/2001 Kosaka et al. .............. 385/132

FOREIGN PATENT DOCUMENTS

| JP | 8-234062 | | 9/1996 | ................... 385/50 |
| JP | 2001-4877 A | * | 1/2001 | ................... 385/39 |

OTHER PUBLICATIONS

Enoch et al., Numerical evidence of ultrarefractive optics in photonic crystals. Optics Communications (161), pp. 171–176. Mar. 1999.*

Mekis et al., Tapered couplers for efficient interfacing between dielectric and photonic crystal waveguides. Journal of Lightwave Technology, vol. 19 No. 6, pp. 861–865. Jun. 2001.*

* cited by examiner

Primary Examiner—Rodney Bovernick
Assistant Examiner—Michael J. Stahl
(74) Attorney, Agent, or Firm—Sughrue Mion, PLLC

(57) ABSTRACT

An optical coupling device for coupling optical waveguide devices having different spot sizes to one another includes photonic crystal having a modulation structure having a refractive index periodic at about the same interval as the wavelength of light used by the optical waveguide devices. The use of the photonic crystal allows the spot size of light at the emitting end of the photonic crystal to be converted into a different size from the spot size at the incident end of the photonic crystal.

13 Claims, 5 Drawing Sheets

OPTICAL COUPLING DEVICE AND OPTICAL COUPLING METHOD USING PHOTONIC CRYSTAL

BACKGROUND OF THE INVENTION

1. Field of the invention

The present invention relates to an optical coupling device and an optical coupling method used in optical communication, particularly in wavelength division multiplex communication and ultra high speed optical communication.

2. Detailed Description of the Related Art

A conventional technique as disclosed in Japanese Patent Laying-Open Publication No. 8-234062 entitled "Optical Coupling Device and Optical Coupling Method" is known. FIG. 1 is a schematic view showing this conventional technique. A core 101 is formed on a semiconductor substrate 102, and the core 101 has its upper surface and side surfaces inclined in the propagation direction of light, so that the cross sectional size thereof gradually changes along this light propagation direction. A first cladding layer 103 is formed to surround the core 101. The refractive index of the first cladding layer 103 is smaller than that of the core 101, and larger than that of the semiconductor substrate 102. Here, the thickness t2 of the first cladding layer 103 is so designed that the spot size at the end plane for optical coupling matches the large spot size of an optical waveguide device, at least in the vicinity of the end plane for optical coupling with the optical waveguide device.

The optical coupling device and optical coupling method permit the spot size to be changed for optically coupling optical waveguide devices having different spot sizes.

The optical coupling device and optical coupling method described above are however encountered with the following disadvantages. More specifically, by the optical coupling device and optical coupling method described above, it is hard to convert the spot size of a light beam at the incident side into an incredibly different size at the emitting side. Particularly in order to reduce the spot size of the emitting side beam to the level of the wavelength, the taper of the upper surface and side surfaces of the core 101 must be extremely steep. The resultant shape might no longer be defined as a taper or inclined surface. As a result, conversion with low losses would be difficult. Particularly in the case of a waveguide using photonic crystal as shown in FIG. 2, the waveguide size will become 1 μm or less, i.e., less than the wavelength, and it would be impossible to convert the spot size into this level by the conventional technique as described above.

SUMMARY OF THE INVENTION

It is an object of the present invention to provide an optical coupling device and an optical coupling method permitting the spot size of a light beam at the incident side to be converted into an incredibly different size at the emitting side.

The present invention is particularly directed to a technique of optically coupling an optical fiber to a waveguide using the photonic crystal as shown in FIG. 2. More specifically, the spot size of light emitted from such an optical fiber is about 10 μm, while the width of the photonic crystal waveguide is 1 μm or less, and therefore the spot size of light should be changed into a size at most 1/10 as large.

An optical coupling device according to the present invention couples optical waveguide devices having different spot sizes and uses photonic crystal having a modulation structure having a refractive index periodic at about the same interval as the wavelength of light used by the optical waveguide devices. As a result, a spot size of the light at an emitting end of said photonic crystal can be a different size from the spot size at an incident end of said photonic crystal.

In the optical coupling device, crystal arrangement and light incident direction thereof may be set so that a dispersion plane of the photonic crystal is inclined when viewed from the light incident direction, whereby a spread width of the light propagating in a photonic crystal in wave number space can be larger than a spread width of the incident light in the wave number space. As a result, a spot size thereof in a real space in inverse proportion to the spread width can be relatively reduced.

Also, in the optical coupling device, curvature of the dispersion plane of the photonic crystal may be set larger than curvature of an light cone of the incident light. Thus, an effective refractive index in the photonic crystal can be increased, the product of the spread width in the wave number space and the spot size in the real space can be reduced, and the spot size of light propagating in the photonic crystal in the real space can be effectively reduced.

In the optical coupling device, the curvature of the dispersion plane of the photonic crystal can be set smaller than the curvature of the light cone of the incident light, so that the spot size of the light propagating in the photonic crystal in the real space can be effectively increased.

An optical coupling method according to the present invention, for an optical coupling device coupling optical waveguides having different spot sizes to one another, uses photonic crystal having a modulation structure having a refractive index periodic about at the same interval as the wavelength of light used by the optical waveguides, so that the spot size at the emitting end of said photonic crystal is converted into a size different from the spot size at the incident end of said photonic crystal.

According to the present invention, the photonic crystal is defined as crystal having a modulation structure having a refractive index periodic at about the same interval as the wavelength of light passing therethrough. According to the present invention, the photonic crystal is applied to an optical coupling device as a lens. Upon the application, the relation between the periodic interval of the photonic crystal and the wavelength and incident angle of light is defined. The modulation structure with the periodic refractive index can be formed, for example, by providing a number of holes 26 in a Si layer 21 sandwiched between a pair of $SiO_2$ layers 22 and 23 as shown in FIG. 3. The effect of the photonic crystal is brought about by the holes 26.

In the photonic crystal used in the present invention, the crystal arrangement and the light incident direction are set so that its dispersion plane (equi-energy plane in a wave number surface) is inclined when viewed in the incident direction of light or so that the curvature of the dispersion plane is larger than the curvature of the light cone of the incident light. In an embodiment, a light incident plane 24 and a light emitting plane 25 form an angle of 70°, while light emitted from an optical fiber forms an angle of 7° with respect to the normal direction of the incident light. Such angles depend on the periodic intervals of holes, the arrangement pattern of the holes and the wavelength of the incident light, rather than limited to 70° and 7°, and these numerical values are determined to enhance the lens effect.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

The principle of the present invention will be now described. The object of converting the spot size of a light beam on the incident side into an incredibly different spot size on the emitting side as described above is achieved by applying the following principle using photonic crystal.

Figure 4:
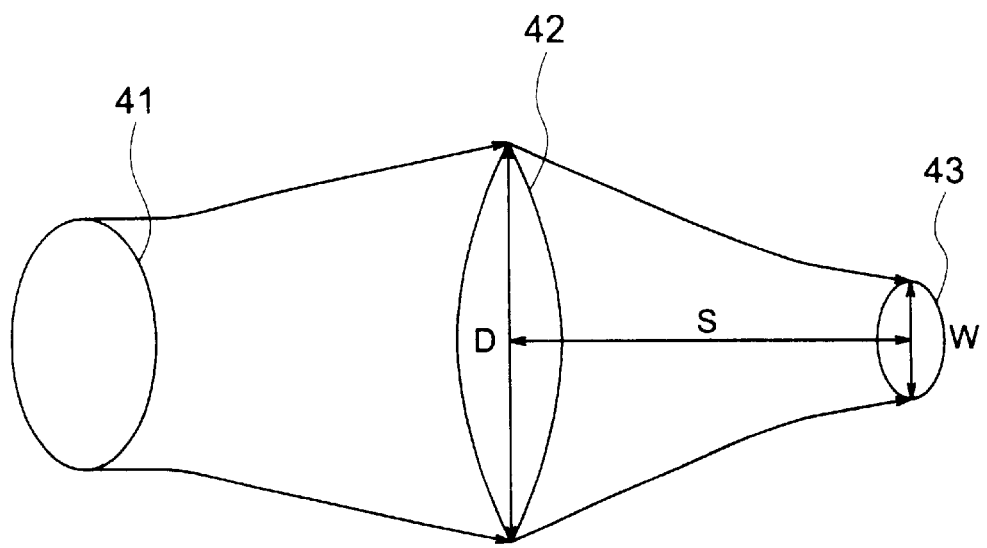
FIGS. 4, 5, 6, and 7 are diagrams for use in illustration of the principle of the present invention.

Let us now consider the simplest spot size conversion case. The spot size can be converted basically using a single lens as shown in FIG. 4. In this case, when the aperture diameter of the lens 42 is D and the distance from the lens 42 to the light condensing spot 43 (light emitting side spot) is S, the diameter W of the light condensing spot (the beam waist W at the distance S where the optical intensity becomes $1/e^2$) is given by the following expression (1):

$$W = 4\lambda/\pi \cdot S/D \tag{1}$$

wherein $\lambda$ represents the wavelength in the medium.

As can be seen from the expression (1), S/D (F value) must be 0.39, in order to establish the relation of the beam waist $W=\lambda/2$. A lens having such an F value is, however, not usually available. Particularly, the focal depth DOF at this time is obtained as $0.39\lambda$ from the following expression (2):

$$DOF = 8\lambda/\pi \cdot [S/D]^2 \tag{2}$$

In this case, the focal depth DOF is only 0.6 $\mu$m if the wavelength is in the 1.55 $\mu$m band. Such a focal depth is significantly disadvantageous in terms of the lens cost, alignment, size and the like.

The limit of such an optical coupling method based on general diffraction engineering described above will be again considered in association with the uncertainty relation. The expression (1) may be rewritten into the following expression (3):

$$W \cdot [2\pi n/\lambda_0 \cdot D/S] = 8 \tag{3}$$

wherein $\lambda_0$ is the wavelength in vacuum, and n is the refractive index of the medium.

In the left part of the expression (3), W represents the spread on a real space, what is between the parentheses [ ] in the left part represents the spread on the wave number space (in the horizontal direction). If these quantities are represented as $\Delta r$ and $\Delta k$, respectively, the expression (3) will be transformed into the following expression (4):

$$\Delta r \Delta k = 8 \tag{4}$$

Meanwhile, the uncertainty relation can be given by the following expression (5):

$$\Delta r \Delta k > 2\pi \tag{5}$$

Therefore, as can be seen from the above, the expression (3) or (4) gives a substantial minimum value in the uncertainty relation represented by the expression (5). More specifically, it can be interpreted that in the simplest spot size conversion described above, $\Delta k$ is intentionally increased and $\Delta r$ is reduced instead, in other words a squeezed state is created.

The refractive index n in the expression (5) is moved to the right part, and the expression (5) is rewritten into the following expression (6) using $k_0$ as a wave number in vacuum.

$$\Delta r \Delta k_0 > 2\pi/n \tag{6}$$

Thus, as can be seen from the expression (6), as n increases, the product of $\Delta r$ and $\Delta k_0$ can be substantially smaller. This can be called "shrink effect" in comparison with the above "squeeze effect", because the product of fluctuation itself is wholly reduced.

In view of the above, the spot size conversion using photonic crystal will be now considered. The above squeeze effect and shrink effect will be described in this order.

Figure 5:
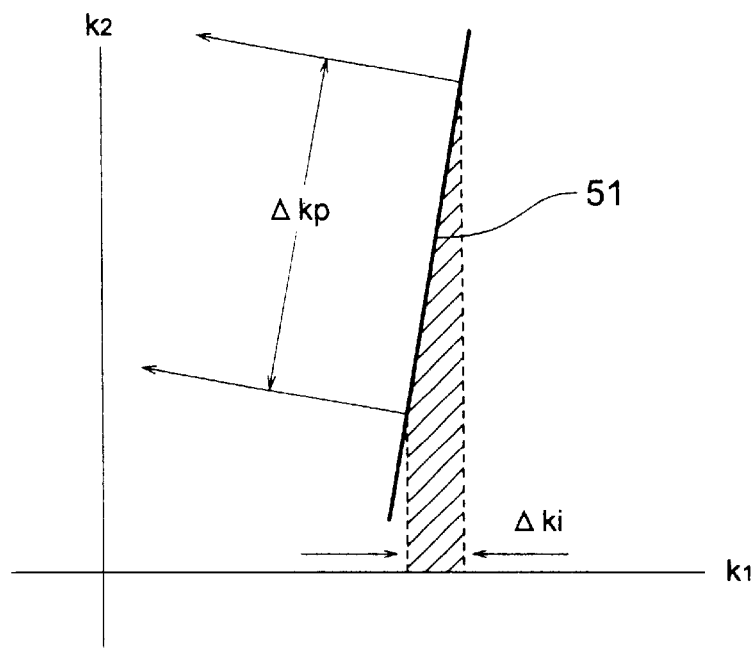

First, a squeeze method which increases $\Delta k$ as much as possible and reduces $\Delta r$ will be considered. Consider a wave number space as shown in FIG. 5. The abscissa represents a wave number component $k_1$ parallel to the incident plane, while the ordinate represents a wave number component $k_2$ perpendicular to the plane. The straight line in FIG. 5 represents a part of dispersion relation normally called refractive index ellipsoid and is referred to as a dispersion plane 51 here. Incident light having a wave number spread of $\Delta k_i$ in the horizontal direction is transformed into a wave number spread of $\Delta k_p$ in the medium by this dispersion plane. As can be seen from FIG. 5, as the dispersion plane 51 is more inclined than the incident plane, the ratio of $\Delta k_p/\Delta k_i$ is larger, while conversely $\Delta r_p$ can be smaller than $\Delta r_i$.

Figure 6:
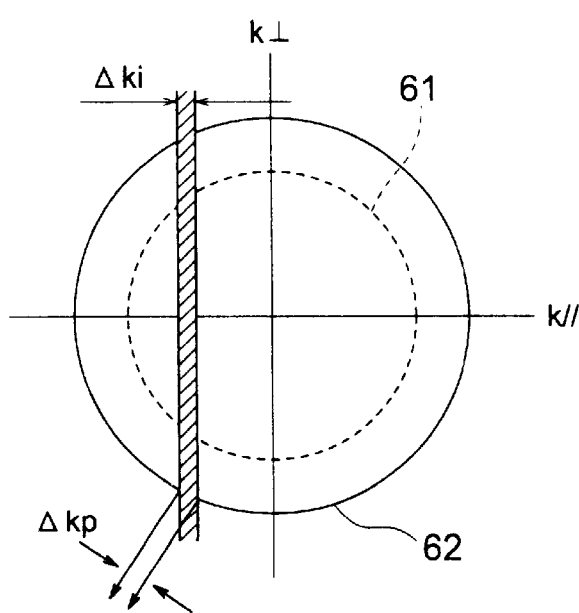

In typical crystal, the dispersion plane 51 (refractive index ellipsoid) is in a circular shape as shown in FIG. 6, and n>1 holds (in the wavelength without absorption), so that a dispersion plane 62 in the medium is always larger than a dispersion plane 61 in vacuum. As a result, the $\Delta k_p/\Delta k_i$ ratio cannot be much large as shown in FIG. 6.

Figure 7:
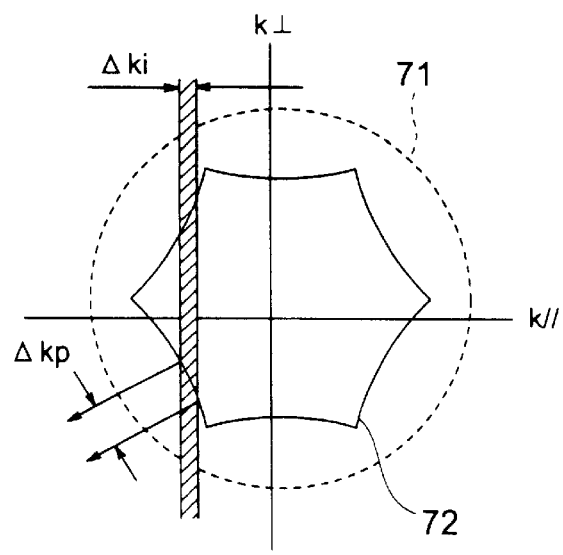

The use of photonic crystal permits the shape of the dispersion plane to be controlled as desired. For example, as shown in FIG. 7, a star-shaped dispersion plane 72 has a part sharply inclined in the shadowed region in FIG. 7, which shows that the $\Delta k_p/\Delta k_i$ ratio is very large. Reference numeral 71 in FIG. 7 represents the dispersion plane in vacuum.

The shrink effect will be now considered. More specifically, by the shrink effect, the effective n is set as an extremely large value, so that $\Delta r$ can be effectively reduced for the same $\Delta k$. Since the refractive index cannot be accurately defined in the photonic crystal, it will be considered from the following viewpoint. In typical (isotropic) crystal, the radius of the circle of the dispersion plane (refractive index ellipsoid) increases in proportion to the refractive index. Since the plane is not circular in the photonic crystal, the effective refractive index is defined by the radius of curvature of a region of interest. More specifically, as the region is more approximate to a straight line, the effective n becomes larger, and the product of Δr and Δk can be reduced. The dispersion plane 72 in FIG. 7 substantially satisfies this condition in the shadowed portion, so that a synergistic effect by two quantities Δk and n may be expected.

Fortunately, in the above n to ∞ condition, collimated light far thinner than the diffraction limit can be generated if conditions are well met. The focal depth (ideally) is infinite as compared to the case of using normal crystal, and there is freedom to transversal position shift, so that the alignment cost can be significantly reduced.

The structure of an optical coupling device according to an embodiment of the present invention will be now described specifically and in detail with reference to the accompanying drawings.

Figure 1:
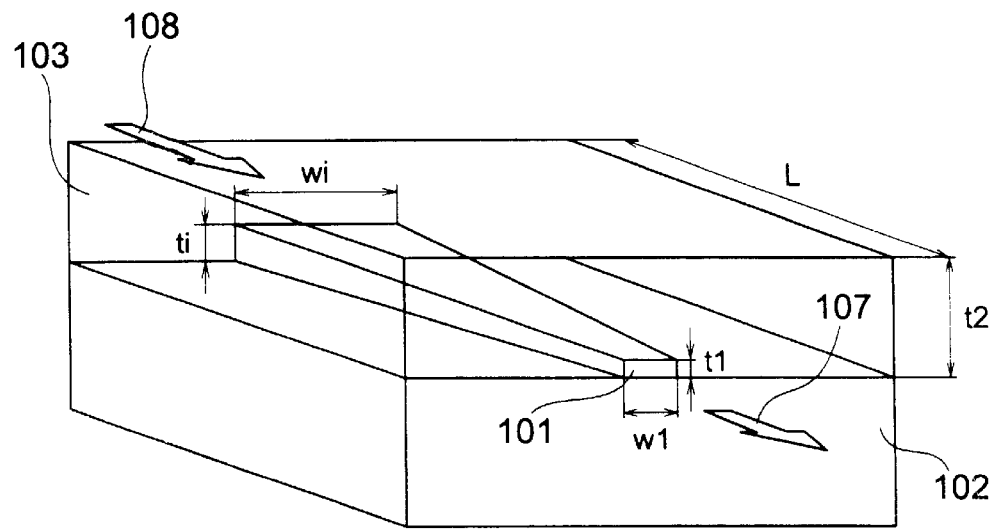
FIG. 1 is a schematic view of a conventional optical coupling device.
Figure 2:
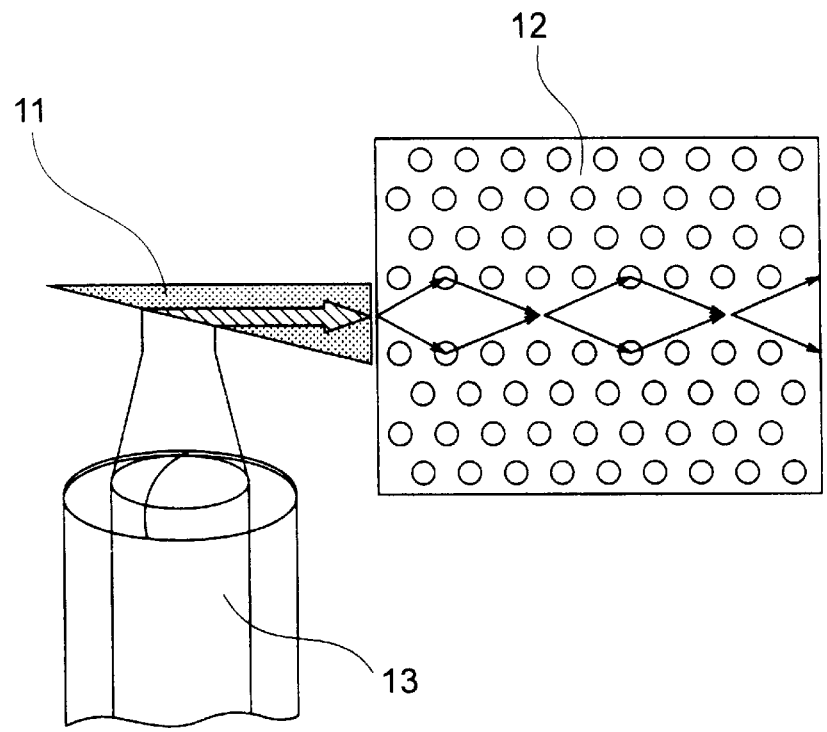
FIG. 2 is a schematic view of an optical coupling device using photonic crystal according to an embodiment of the present invention.
Figure 3:
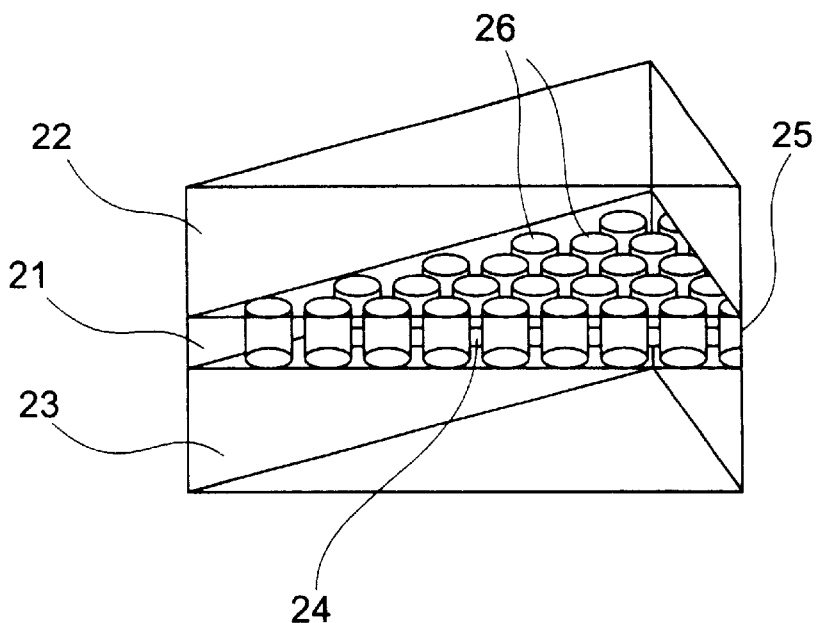
FIG. 3 is a schematic view showing the structure of photonic crystal for optical coupling in the optical coupling device according to the embodiment of the present invention.

FIG. 2 is a schematic view of the structure of the optical coupling device according to the present embodiment, and FIG. 3 is a schematic view of the structure of photonic crystal used in the optical coupling device.

The dispersion plane 72 having a star-like shape as shown in FIG. 7 can be obtained from actual photonic crystal. FIG. 3 is a perspective view of the structure of the photonic crystal. A Si (silicon) layer 21 having a thickness of 2 μm is sandwiched between upper and lower, two SiO$_2$ (silicon oxide) layers 22 and 23. The Si layer 21 is provided with cylindrical holes 26 having a diameter of 0.6 μm at a pitch of 0.7 μm arranged in a grid manner.

Photonic crystal 11 for optical coupling cut from the photonic crystal as above is provided between an optical fiber 13 and a photonic crystal waveguide 12 as shown in FIG. 2. The structure of the photonic crystal 11 for optical coupling will be now described.

More specifically, the photonic crystal having the structure shown in FIG. 3 is processed into a triangular plate shape. One cross section of the composite structure of the Si layer 21 and the SiO$_2$ layers 22 and 23 placed upon one another is set as a light incident plane 24, and another cross section inclined with respect to the incident plane 24 is set as a light emitting plane 25. The composite structure of the Si layer 21, and the SiO$_2$ layers 22 and 23 placed upon one another are optically polished so that the light incident plane 24 and the light emitting plane 25 form an angle of 70°. The photonic crystal thus processed is provided as the photonic crystal 11 for optical coupling between the optical fiber 13 and the photonic crystal waveguide 12 as shown in FIG. 2. The inclination of the emitting plane 25 of the photonic crystal 11 for optical coupling is set at 70° with respect to the normal direction to the incident plane of the photonic crystal waveguide 12. The light emitted from the optical fiber 13 is allowed to come into the incident plane 24 at an angle of 7° with respective to the normal direction to the incident plane 24 of the photonic crystal 11 for optical coupling. The incident plane 24 of the photonic crystal 11 for optical coupling (see FIG. 3) and the emitting plane 25 (see FIG. 3) form an angle of 70° as described above. The wavelength of the light emitted from the optical fiber is assumed to be 1.55 μm.

Figure 8:
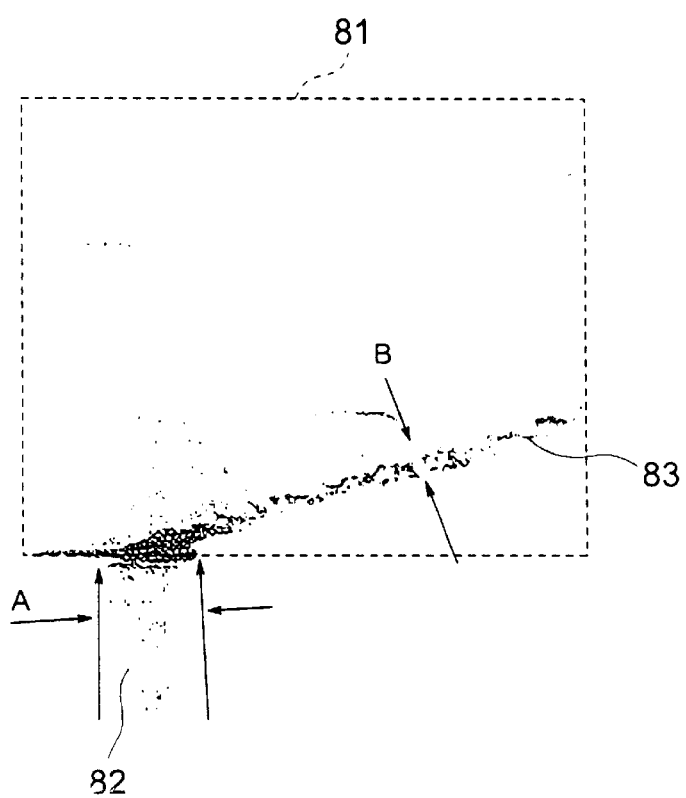
FIG. 8 is used for illustrating the effect of spot size conversion for an optical coupling device used in the embodiment according to the present invention.
Figure 9:
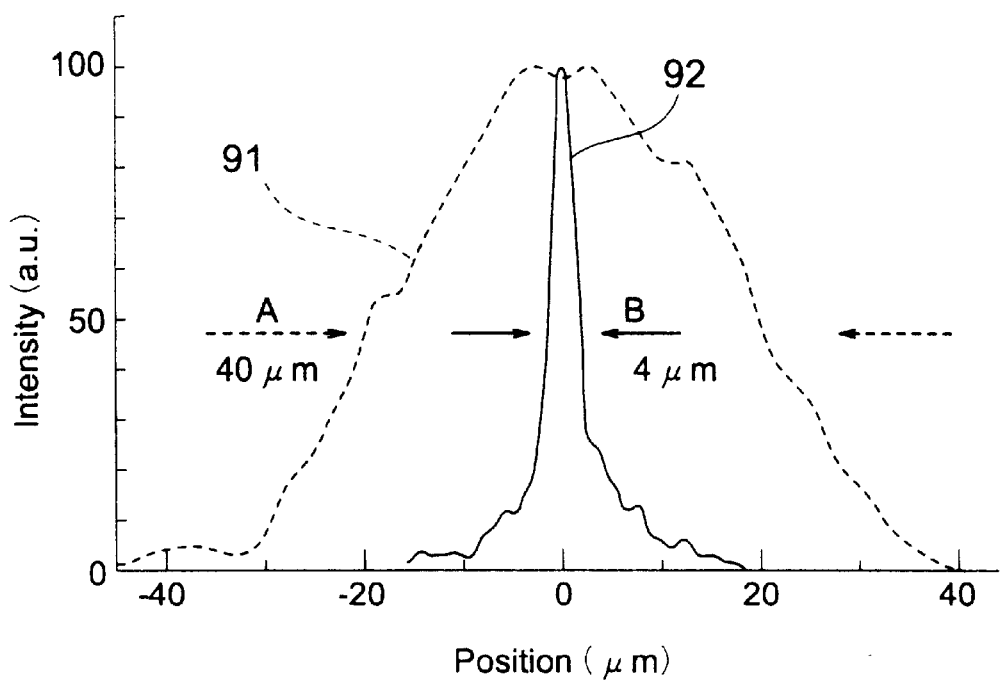
FIG. 9 is a graph for use in illustration of the effect of spot size conversion for the optical coupling device used in the embodiment according to the present invention.

The result of an experiment in which the spot size was actually converted is given in FIGS. 8 and 9. The mode width (A) of incident light 82 was about 40 μm, while the mode width (B) of light 83 propagating in photonic crystal 81 was about 4 μm. As a result, a spot size conversion ratio of 1/10 resulted. In this experiment, the mode width (A) of the incident light 82 was about 40 μm for the ease of evaluation. However, light emitted from the optical fiber 13 having a core size of 10 μm as shown in FIG. 2 may be reduced in size to the level of about 5 μm by spherically sharpening the top of the optical fiber for incidence to the photonic crystal 11 for optical coupling. Then, the light is converted at the ratio of 1/10 through the photonic crystal 11 for optical coupling, and a spot size of 0.5 μm results, so that efficient optical coupling to the photonic crystal waveguide 12 can be achieved.

Thus, according to the present invention, efficient optical coupling can be achieved to an optical waveguide device having a waveguide width about as large as the wavelength.

While there has been described what are at present considered to be preferred embodiments of the invention, it will be understood that various modifications may be made thereto, and it is intended that the appended claims cover all such modification as fall within the true spirit and scope of the invention.

What is claimed is:

1. An optical coupling device for coupling optical waveguide devices having different spot sizes to one another, comprising photonic crystal having a modulation structure of a refractive index modulated periodic at about the same interval as the wavelength of light used by said optical waveguide devices, a spot size of the light at an emitting end of said photonic crystal being converted into a different size from the spot size at an incident end of said photonic crystal.

2. The optical coupling device according to claim 1, wherein crystal arrangement and light incident direction of said photonic crystal are set so that a dispersion plane of said photonic crystal is inclined when viewed from the light incident direction, whereby a spread width of the light propagating in the photonic crystal in wave number space is larger than a spread width of the incident light in the wave number space to relatively reduce a spot size thereof in a real space in inverse proportion to the spread width.

3. The optical coupling device according to claim 1, wherein curvature of the dispersion plane of said photonic crystal is set larger than a curvature of a light cone of the incident light, an effective refractive index in the photonic crystal is increased, the product of the spread width in the wave number space and the spot size in the real space is reduced, and the spot size of light propagating in the photonic crystal in the real space is effectively reduced.

4. The optical coupling device according to claim 2, wherein curvature of the dispersion plane of said photonic crystal is set larger than a curvature of a light cone of the incident light, an effective refractive index in the photonic crystal is increased, the product of the spread width in the wave number space and the spot size in the real space is reduced, and the spot size of light propagating in the photonic crystal in the real space is effectively reduced.

5. The optical coupling device according to claim 1, wherein the curvature of the dispersion plane of said photonic crystal is set smaller than a curvature of a light cone of the incident light, so that the spot size of the light propagating in the photonic crystal in the real space is effectively increased.

6. The optical coupling device according to claim 2, wherein the curvature of the dispersion plane of said photonic crystal is set smaller than a curvature of a light cone of the incident light, so that the spot size of the light propagating in the photonic crystal in the real space is effectively increased.

7. An optical coupling method:

coupling optical waveguide devices having different spot sizes to one another, wherein as an optical coupling device coupling optical waveguide devices, photonic crystal having a modulation structure having a refractive index modulated periodic at about the same interval as the wavelength of light used by said optical waveguide devices is used, so that the spot size of the light at the emitting end of said photonic crystal is converted into a different size from the spot size at an incident end of said photonic crystal.

8. An optical coupling method for coupling optical waveguide devices having different spot sizes to one another, the method comprising:

disposing a photonic crystal having a modulation structure between said waveguide devices, said modulation structure having a refractive index modulated periodic at about the same interval as the wavelength of light used by said optical waveguide devices, and converting a first spot size of the light at an emitting end of said photonic crystal into a second spot size at an incident end of said photonic crystal, said second spot size being different from said first spot size.

9. The optical coupling method according to claim 8, wherein a crystal arrangement and light incident direction of said photonic crystal are set so that a dispersion plane of said photonic crystal is inclined when viewed from the light incident direction, whereby a spread width of the light propagating in the photonic crystal in wave number space is larger than a spread width of the incident light in the wave number space to relatively reduce a spot size thereof in a real space in inverse proportion to the spread width.

10. The optical coupling method according to claim 8, wherein curvature of the dispersion plane of said photonic crystal is set larger than a curvature of a light cone of the incident light, an effective refractive index in the photonic crystal is increased, the product of the spread width in the wave number space and the spot size in the real space is reduced, and the spot size of light propagating in the photonic crystal in the real space is effectively reduced.

11. The optical coupling method according to claim 9, wherein curvature of the dispersion plane of said photonic crystal is set larger than a curvature of a light cone of the incident light, an effective refractive index in the photonic crystal is increased, the product of the spread width in the wave number space and the spot size in the real space is reduced, and the spot size of light propagating in the photonic crystal in the real space is effectively reduced.

12. The optical coupling method according to claim 8, wherein the curvature of the dispersion plane of said photonic crystal is set smaller than a curvature of a light cone of the incident light, so that the spot size of the light propagating in the photonic crystal in the real space is effectively increased.

13. The optical coupling method according to claim 9, wherein the curvature of the dispersion plane of said photonic crystal is set smaller than a curvature of a light cone of the incident light, so that the spot size of the light propagating in the photonic crystal in the real space is effectively increased.

* * * * *

UNITED STATES PATENT AND TRADEMARK OFFICE
CERTIFICATE OF CORRECTION

PATENT NO.   : 6,381,389 B1
DATED        : April 30, 2002
INVENTOR(S)  : Hideo Kosaka It is certified that error appears in the above-identified patent and that said Letters Patent is hereby corrected as shown below:

Column 5,
Lines 3 and 4, delete "Ar and Ak" insert -- $\Delta$r and $\Delta$k --.

Signed and Sealed this

Twenty-first Day of January, 2003

JAMES E. ROGAN
*Director of the United States Patent and Trademark Office*